(12) United States Patent
Funamoto et al.

(10) Patent No.: US 6,820,994 B2
(45) Date of Patent: Nov. 23, 2004

(54) LIGHTING DEVICE, AND ELECTRONIC DEVICE USING THE SAME

(75) Inventors: Tatsuaki Funamoto, Chino (JP); Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/623,499

(22) Filed: Jul. 22, 2003

(65) Prior Publication Data

US 2004/0052066 A1 Mar. 18, 2004

Related U.S. Application Data

(62) Division of application No. 09/791,638, filed on Feb. 26, 2001, now Pat. No. 6,626,551.

(30) Foreign Application Priority Data

Feb. 25, 2000 (JP) ........................................ 2000-050161
Dec. 8, 2000 (JP) ........................................ 2000-383803

(51) Int. Cl.[7] .............................................. F21V 9/16
(52) U.S. Cl. ........................ 362/84; 362/31; 362/555; 362/560; 362/561; 362/327; 362/330; 362/341; 362/30; 362/26

(58) Field of Search ......................... 362/84, 31, 555, 362/560, 561, 296, 311, 327, 330, 341, 30, 26

(56) References Cited

U.S. PATENT DOCUMENTS

| 5,404,277 A | 4/1995 | Lindblad |
| 5,975,711 A | 11/1999 | Parker et al. |
| 6,025,894 A | 2/2000 | Shirasaki et al. |

*Primary Examiner*—Stephen Husar
*Assistant Examiner*—Sharon Payne
(74) *Attorney, Agent, or Firm*—Oliff & Berridge, PLC

(57) ABSTRACT

A composite lighting device is provided, which is inexpensive and has high uniformity in brightness, in which light emitted from an end face of a backlight having an organic EL device is used to illuminate input buttons and the like. The lighting device includes a transparent substrate having one principal plane on which a transparent electrode film, a luminescent layer, and a reflective electrode film are at least formed. In the lighting device, a liquid crystal display unit is adjacently disposed on the other principal plane, and a light-guide element is adjacent to an end face of the substrate, so that input buttons embedded into the light-guide element are illuminated.

13 Claims, 2 Drawing Sheets

LIGHTING DEVICE, AND ELECTRONIC DEVICE USING THE SAME

This is a Divisional of application No. 09/791,638 filed Feb. 26, 2001 now U.S. Pat. No. 6,626,551. The entire disclosure of the application is hereby incorporated by reference herein in its entirety.

BACKGROUND OF THE INVENTION

1. Field of Invention

The present invention relates to a lighting device and an electronic device using the lighting device. More specifically, the present invention relates to a lighting device having an organic electroluminescent (hereinafter referred to as an "organic EL") device and capable of simultaneously illuminating a transmission-type display unit, such as a liquid crystal display unit, input buttons, etc., on a mobile telephone and the like, and to an electronic device using the lighting device.

2. Description of Related Art

A related lighting device capable of illuminating a transmission-type display unit, such as a liquid crystal display unit, and input buttons is described with reference to FIG. 6. As shown in this figure, the conventional lighting device is divided into a part for illuminating a liquid crystal display unit 203 with a light source 202a adjacent to an end face of a light-guide panel 201, and a part for illuminating input buttons 206 using light sources 202b mounted on a switch substrate 207. About two to eight light-emitting diodes (LEDs) are used for the light source 202a, and six to fifteen light emitting diodes (LEDs) are used for the light sources 202b.

SUMMARY OF THE INVENTION

In the above-described lighting device, a light source for illuminating the liquid crystal display unit part is separate from a light source for illuminating the other parts, and these sources employ a number of light-emitting diodes (LEDs), respectively. However, these have problems of complicated structure as well as low uniformity in brightness.

The present invention is intended to at least solve the foregoing problems. It is an object thereof to provide a lighting device, which is less expensive and has high uniformity in brightness, in which an organic EL lighting device is used to illuminate a liquid crystal display unit while a light beam emitted from its end face is used to illuminate the other components, and to provide an electronic device using the same.

A lighting device according to one exemplary embodiment of the present invention includes an organic electroluminescent element, and a transparent substrate, the substrate having a first principal plane on which light from the organic electroluminescent element is incident, and a second principal plane. The light incident on the substrate includes first light emitted from a second principal plane of the substrate, and second light emitted from a plane other than the first and second principal planes. The first and second lights may be used to illuminate different objects to be illuminated. With this arrangement, backlighting with high uniformity, for liquid crystal displays, etc., and illumination for the other parts can be realized with a simple structure.

In a lighting device according to another exemplary embodiment of the present invention, the lighting device described above further includes a reflector member for reflecting a portion of the first light. A third light reflected by the reflector member may be used to illuminate the same object to be illuminated by the second light. Therefore, in addition to light emitted from an end of a substrate, light transmitted by the substrate can also be introduced by a reflector portion of a light-guide element to an object to be objected, thus achieving efficient illumination.

In a lighting device according to another exemplary embodiment of the present invention, the lighting device described above further includes a reflector member for transmitting a first light component of the first light having a specific wavelength, and for reflecting a second light component other than the first light component. The first light component and the second light component may be used to illuminate different objects to be illuminated. Therefore, for example, a liquid crystal display unit can be illuminated by green light while an object to be illuminated can be illuminated by red light at the same time.

In a lighting device according to another exemplary embodiment of the present invention, the organic electroluminescent element includes a pixel region on which the first light is generated to display arbitrary information, and an illuminator region on which the second light is generated to illuminate an object to be illuminated. Therefore, displaying arbitrary information and illuminating an object to be illuminated can be realized by a single lighting device at the same time.

An electronic device according to one exemplary embodiment of the present invention may include the lighting device described above a display unit illuminated by the first light to display arbitrary information, and a key input unit illuminated by the second light. A transmission-type display unit such as a liquid crystal display unit, and input key buttons on an electronic device such as a mobile telephone can be illuminated at the same time.

DETAILED DESCRIPTION OF PREFERRED EMBODIMENTS

Figure 1:
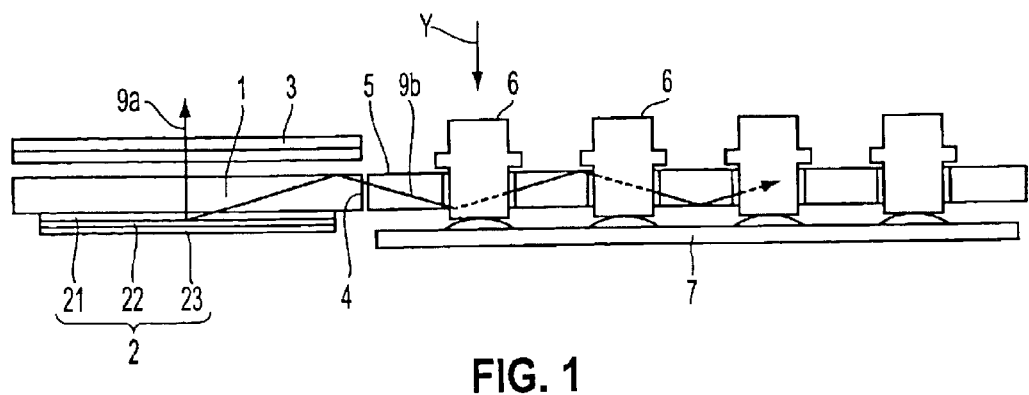
FIG. 1 is a cross-sectional view showing the structure of a lighting device according to a first exemplary embodiment of the present invention.

Exemplary embodiments of the present invention are described with reference to the drawings. It will be noted that throughout the figures, taken in conjunction with the following description, components in one figure equivalent to those in another figure are designated by the same reference numerals.

(1) First Exemplary Embodiment

FIG. 1 is a cross-sectional view showing a lighting device according to a first exemplary embodiment of the present invention. This figure illustrates a side view of the lighting device. In this figure, a substrate 1 is made of a transparent material. Materials for the substrate 1 include, for example, glass, quartz, sapphire, and plastic such as acrylic or polycarbonate. The substrate 1 has one principal plane on which an organic EL device 2 is formed. The organic EL device 2 is composed of a transparent electrode film 21, a luminescent layer 22, and a reflective electrode film 23, in the stated order from the substrate 1. The luminescent layer 22 is shown simplified in the figure, but in fact, is formed of a plurality of layers including a hole-transporting layer, an organic EL luminescent layer, and an electron-transporting layer.

The transparent electrode film 21 is used for an electrode at a location side where light exits. The transparent electrode film 21 may be made of ITO (indium tin oxide), or, alternatively, IZO (indium zinc oxide), ZnO, or the like.

It is generally desirable that the luminescent layer 22 be formed by separating a hole-transporting layer, an organic EL luminescent film, and an electron-transporting layer in functionality. However, this is not restrictive, and a hole-injecting layer may be introduced between a transparent electrode layer and a hole-transporting layer. A very thin insulator as an electron-injecting layer may be introduced between a reflective electrode layer and an electron-transporting layer. Furthermore, a trace amount of fluorescent pigment may be introduced to a hole-transporting layer or an electron-transporting layer so that luminescent colors may be freely selected depending upon the introduced fluorescent pigment.

Hole-transporting materials used for the luminescent layer 22 include tetraaryl-benzidine compounds (triaryldiamines or triphenyldiamines: TPD).

Electron-transporting compounds preferably include quinoline derivatives, metal complexes containing 8-quinolinol or a derivative thereof as a ligand, in particular, tris(8-quinolinolato)aluminum (Alq3).

A variety of film-forming techniques including vacuum deposition, sputtering, spin coating, dipping, and ink-jet printing may be selected to form an organic EL light-emitting film, regardless of molecular weight.

The reflective electrode film 23 may be formed of a conductive material, and, in particular, Al is preferable as the metal, and Mg—Ag alloy, Al alloy, etc. as the alloy.

A liquid crystal display unit 3 is disposed at the other principal plane side of the substrate 1 on which the organic EL device 2 is not formed. A light-guide element 5 is placed at an end face 4 side of the substrate 1. The light-guide element 5 has input buttons 6 embedded therein. The input buttons 6 are preferably made of a material having light scattering property. A switch substrate 7 is beneath the input buttons 6 so that connection and disconnection of switches on the switch substrate 7 may be controlled by pressing the input buttons 6 in the direction indicated by an arrow Y.

With such a structure, when the organic EL device 2 is driven, light is emitted from the organic EL device 2. In this figure, there are shown a light beam 9a and a light beam 9b as examples of light beams emitted from the organic EL device 2. The light beam 9a passes through the substrate 1 at an angle less than the critical angle, and exits from the principal plane, which becomes first light used as backlight for the liquid crystal display unit 3 to be illuminated. The light beam 9b is reflected off the surface of the substrate 1 at an angle more than the critical angle, and is then emitted from the end face 4, forming second light. The light beam 9b enters the light-guide element 5 to illuminate the input button 6.

The light-guide element 5 is made of a transparent material. Materials for the light-guide element 5 include acrylic resin and polycarbonate resin. Materials for the input button 6 include a milky white resin, containing dispersed diffusing agent, such as white pigment, and elastomer.

(2) Second Exemplary Embodiment

Figure 2:
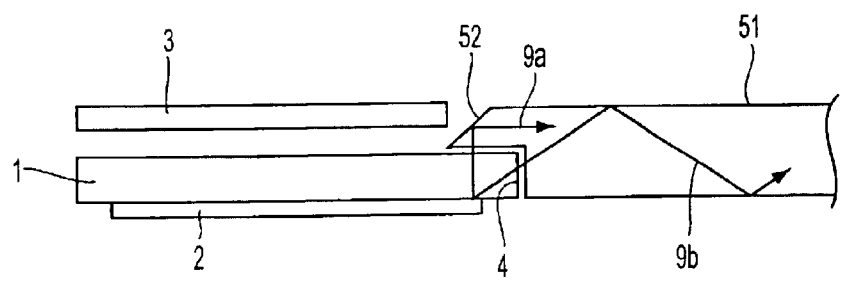
FIG. 2 is a cross-sectional view showing the structure of a lighting device according to a second exemplary embodiment of the present invention.

FIG. 2 is a cross-sectional view showing a lighting device according to a second exemplary embodiment of the present invention. In this figure, the structure is the same as that of the first embodiment except for the structure of a portion where the substrate 1 is adjacent to a light-guide element 51, and thus the above-described input buttons 6, etc., are omitted in the illustration. The lighting device shown in this figure includes the light-guide element 51. The light-guide element 51 guides the light beam 9b emitted from the end face of the substrate 1 toward the input buttons 6, and includes a reflector 52 for also guiding a portion of the light beam 9a exiting from the principal plane of the substrate 1 toward the input buttons 6. With such a structure, when the organic EL device 2 emits light, the light transmitted by the substrate 1 is reflected and guided toward the buttons to be illuminated, as well as the light emitted from the end of the substrate 1, thus providing efficient illumination.

Accordingly, the present embodiment further provides a reflector member, as the reflecting panel 52, for reflecting a portion of the first light, such that the third light reflected by the reflector member is used to illuminate the same object to be illuminated by the second light. Hence, a lighting device capable of backlighting for a liquid crystal display unit and illuminating input buttons, etc., is attained with a simple structure and high uniformity in brightness.

(3) Third Exemplary Embodiment

Figure 3:
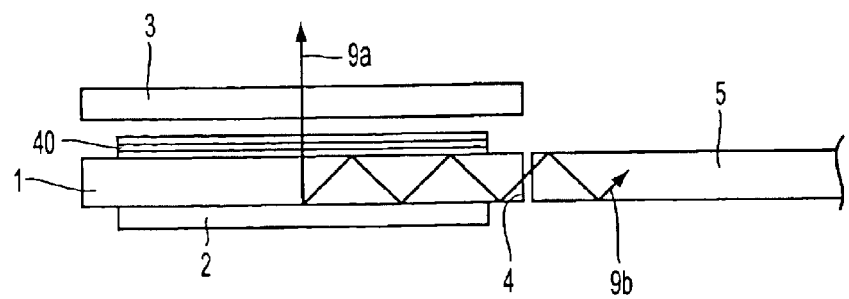
FIG. 3 is a cross-sectional view showing the structure of a lighting device according to a third exemplary embodiment of the present invention.

FIG. 3 is a cross-sectional view showing a lighting device according to a third exemplary embodiment of the present invention. In this figure, the structure is substantially the same as that of the first embodiment except for the structure at the location where the liquid crystal display unit 3 of the substrate 1 is disposed, and thus the above-described input buttons 6, etc., are omitted in the illustration. The lighting device shown in this figure is so arranged that the light beam 9a from the principal plane of the substrate 1 is incident on the liquid crystal display unit 3 through a dielectric multi-layer reflective film (DBR; distributed bragg reflector) 40. The dielectric multilayer reflective film 40 is implemented by, for example, alternating $Ta_2O_5$ layers and $SiO_2$ layers. The thickness of each of the layers may be determined depending upon the wavelength of light components to be transmitted or reflected.

The dielectric multilayer reflective film 40 enables the luminescent color of backlight and the luminescent color for the input buttons to be different from each other. For example, the layers of the dielectric multilayer reflective film 40 are designed such that the color of light to be transmitted by the dielectric multilayer reflective film 40 is green and the color of light not to be transmitted but to be reflected by the dielectric multilayer reflective film 40 is red. This enables the liquid crystal display unit 3 to be illuminated by green light, and the buttons 6 to be illuminated by red light.

Accordingly, the present embodiment further provides a reflector member for transmitting a first light component having a particular wavelength, out of the first light emitted from the principal plane of the substrate 1, and for reflecting a second light component other than the first light component, such that the first light component and the second light component are used to illuminate different objects to be illuminated. This requires only a single light source to illuminate different objects to be illuminated by light of different colors.

(4) Fourth Exemplary Embodiment

Figure 4:
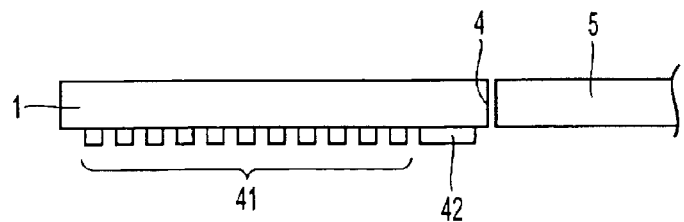
FIG. 4 is a cross-sectional view showing the structure of a lighting device according to a fourth exemplary embodiment of the present invention.

FIG. 4 is a cross-sectional view of a lighting device according to a fourth exemplary embodiment of the present invention. In this figure, an organic EL device is used as a display unit, the light-guide element 5, etc., have the same structure as in the previously described embodiments, and thus the above-described input buttons 6, etc., are omitted in the illustration. In this figure, the lighting device according to the fourth embodiment is characterized by the pixel arrangement in the organic EL device 2. Specifically, as shown in this figure, the organic EL device 2 includes a pixel region 41 formed of pixels for display, and an illuminator region 42 for illuminating the buttons. In summary, an organic EL device for button illumination is mounted on a portion of the organic EL display panel.

With such a structure, when the organic EL device 2 is driven, the pixel region 41 contributes to a predetermined display. At the same time, the illuminator region 42 serves to illuminate the buttons 6. Therefore, displaying arbitrary information and illuminating an object to be illuminated can be realized at the same time in a single lighting device. In the present embodiment, therefore, the organic EL device 2 includes a pixel region 41 on which first light is generated to display arbitrary information, and an illuminator region 42 on which second light is generated to illuminate an object to be illuminated.

Here, the area ratio of the pixel region 41 to the illuminator region 42 is determined in consideration of the amount of light emitted from the organic EL device 2. Since the light emitted from the illuminator region 42 is used for illumination on the buttons, and the light emitted from the pixel region 41 is also used for illumination on the buttons, the illuminator region 42 can have a reduced area if the amount of light emitted from the pixel region 41 is large. Conversely, if the amount of light emitted from the pixel region 41 is small, the area of the illumination region 42 must be increased.

(5) Fifth Exemplary Embodiment

Figure 5:
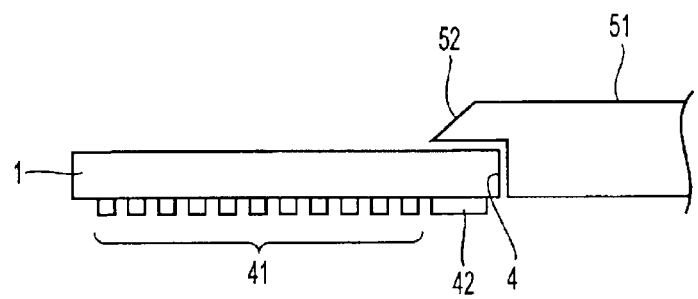
FIG. 5 is a cross-sectional view showing the structure of a lighting device according to a fifth exemplary embodiment of the present invention.
Figure 6:
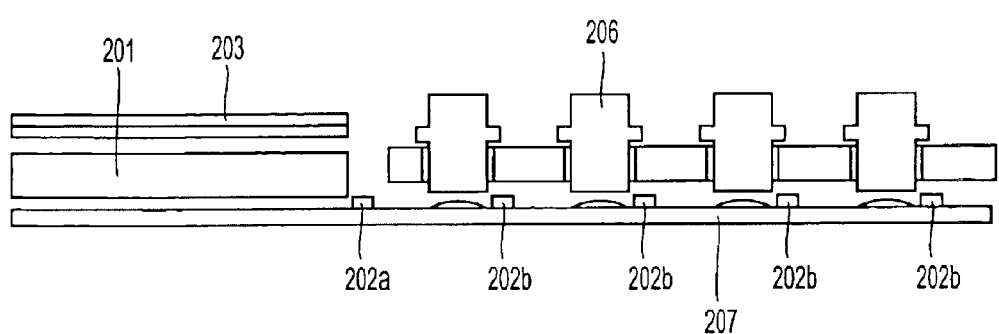
FIG. 6 is a cross-sectional view showing the structure of a related lighting device.

FIG. 5 is a cross-sectional view of a lighting device according to a fifth exemplary embodiment of the present invention. In this figure, the input buttons 6, etc., have the same structure as that of the previously described embodiments, and are thus omitted in the illustration. In this figure, the lighting device according to the fifth embodiment includes an organic EL device 2 having the same structure as that of the fourth embodiment in conjunction with the second embodiment in which the light-guide element 51 with the reflector portion 52 is employed.

Accordingly, the present embodiment provides a reflector member for reflecting a portion of the first light, such that the third light reflected by the reflector member is used to illuminate the same object to be illuminated by the second light. Furthermore, the organic EL device 2 includes a pixel region 41 on which first light is generated to display arbitrary information, and an illuminator region 42 on which second light is generated to illuminate an object to be illuminated. With such a structure, when the organic EL device 2 is driven, the pixel region 42 contributes to a predetermined display. At the same time, the illuminator region 42 serves to illuminate the buttons 6. In this case, the reflector unit of the light-guide element 41 can be used to guide the light transmitted by the substrate 1 into the buttons to be illuminated, thus achieving efficient illumination.

The area ratio of the pixel region 41 to the illuminator region 42 is determined in consideration of the amount of light emitted from the organic EL device 2, as previously described with respect to the fourth embodiment.

According to the illustrated embodiments, a lighting device capable of simultaneously illuminating a liquid crystal display unit and input buttons is feasible. It is obvious that such a lighting device can be applied to a variety of electronic devices in addition to mobile information terminals. A single lighting device incorporated in a variety of electronic devices would simultaneously illuminate a display unit and an input unit such as input key buttons.

In further aspects, the present invention provides:

(1) A lighting device, in which illuminating light is emitted from either a plane of a transparent substrate having an organic electroluminescent element formed thereon, or a plane on which the organic electroluminescent element is formed, wherein a light-guide element having a light scattering portion may be disposed at an end face of the substrate.

(2) The lighting device described above, wherein an input button made of a material having light scattering property may be formed on the light-guide element.

(3) An electronic device including: a lighting device, in which illuminating light is emitted from either a plane of a transparent substrate having an organic electroluminescent element formed thereon, or a plane on which the organic electroluminescent element is formed, wherein a light-guide element having a light scattering portion may be disposed at an end face of the substrate; and an operating button made of a material having light scattering property, the button being disposed on the light-guide element.

[Advantages]

As described above, the present invention provides at least a lighting device including an organic electroluminescent element, and a substrate, which is transparent, the substrate having a first principal plane on which light from the organic electroluminescent element is incident, wherein the light incident on said substrate may include a first light emitted from a second principal plane of said substrate, and a second light emitted from a plane other than the first and second principal planes, the first and second light being used to illuminate different objects to be illuminated. Therefore, at least an advantage is that backlighting with high uniformity, for a display unit such as a liquid crystal display, and illumination of the other components can be realized with a simple structure.

Furthermore, the lighting device may further include a reflector member for reflecting a portion of the first light, wherein a third light reflected by the reflector member may be used to illuminate the same object to be illuminated by the second light. Therefore, another advantage is that light transmitted by a substrate can be guided by a reflector unit of a light-guide element toward an object to be illuminated, as well as light emitted from an end of the substrate, thus providing efficient illumination.

Furthermore, the lighting device may further include a reflector member for transmitting a first light component of the first light having a specific wavelength, and for reflecting a second light component other than the first light component, wherein the first light component and the second light component may be used to illuminate different objects to be illuminated. Therefore, another advantage is that, for example, a liquid crystal display unit can be illuminated by green light while an object to be illuminated is illuminated by red light at the same time.

The organic electroluminescent element may include a pixel region on which the first light is generated to display arbitrary information, and an illuminator region on which the second light is generated to illuminate an object to be illuminated. Therefore, another advantage is that displaying arbitrary information and illuminating an object to be illuminated can be realized in a single lighting device at the same time.

By using the lighting device in accordance with the exemplary embodiments of this invention, where a display unit is illuminated by the first light to display arbitrary information, and a key input unit is illuminated by the second light, a transmission-type display unit such as a liquid crystal display unit and input key buttons on an electronic device such as a mobile telephone can be illuminated at the same time.

What is claimed is:

1. A lighting device, comprising:
   an organic electroluminescent device;
   a substrate on which the organic electroluminescent device is formed, and having a first principle plane opposite to a second principal plane, the organic electroluminescent device formed on the second principal plane; and
   a light-guide element having a reflector, only a first part of the first principal plane being overlapped by the light-guide element, the light emitted from the organic electroluminescent device entering an inside of the light-guide element through only a second part of the first principal plane of the substrate and the first part of the light-guide element, and the reflector reflecting a light incident into the light-guide element.

2. The lighting device according to claim 1, a distance between the first principal plane and the second principal plane corresponding to a thickness of the substrate.

3. The lighting device according to claim 1, the light-guide element having a surface facing to an end face side of the substrate.

4. The lighting device according to claim 1, the light-guide element being thicker than that of the substrate.

5. The lighting device according to claim 1, the organic electroluminescent including a pixel region formed of pixels for displaying information and an illuminator region for illuminating the light-guide element.

6. The lighting device according to claim 5, the size of each organic electroluminescent in said pixel region is different from the one in said illuminator region.

7. A lighting device, comprising:
   a light-emitting device;
   a substrate, light emitted by the light-emitting device entering the substrate, the substrate having a first principal plane and a second principal plane opposite to the first principal plane; and
   a light-guide element, the light emitted from the light-emitting device entering an inside of the light-guide element through a first part of the light-guide element from a second part of the first principal plane;
   the second principal plane, partially overlapped by the light-guide element, and the first part of the light-guide element overlapping the second part of the first principal plane.

8. The lighting device according to claim 7, a distance between the first principal plane and the second principal plane corresponding to a thickness of the substrate.

9. The lighting device according to claim 7, the light-guide element having a surface facing to an end face side of the substrate.

10. The lighting device according to claim 7, the light-guide element being thicker than that of the substrate.

11. An electronic device, comprising:
   a lighting device having:
      a light-emitting device;
      a substrate, a light emitted by the light-emitting device entering the substrate, the substrate having a first principal plane and a second principal plane opposite to the first principal plane;
      a light-guide element, the light emitted from the light-emitting device entering an inside of the light-guide element through a first part of the light-guide element from a second part of the first principal plane, the second principal plane partially overlapped by the light-guide element, and the first part of the light-guide element overlapping the second part of the first principal plane; and
   a display unit disposed above the substrate and illuminated by a light emitted from the first principal plane.

12. The electronic device according to claim 11, a key input unit is formed in the light-guide element.

13. The electronic device according to claim 11, the light-guide element and the display unit are disposed on the same surface of the substrate, not overlapping each other.

* * * * *